US009109110B2

(12) United States Patent
Alidedeoglu et al.

(10) Patent No.: US 9,109,110 B2
(45) Date of Patent: *Aug. 18, 2015

(54) METHOD FOR THE PREPARATION OF MODIFIED POLY(ALKYLENE TEREPHTHALATE) EMPLOYING IN SITU TITANIUM-CONTAINING CATALYST

(71) Applicants: Husnu Alp Alidedeoglu, Evansville, IN (US); Ganesh Kannan, Evansville, IN (US); Tianhua Ding, Newburgh, IN (US); Tukaram Gunale, Bangalore (IN)

(72) Inventors: Husnu Alp Alidedeoglu, Evansville, IN (US); Ganesh Kannan, Evansville, IN (US); Tianhua Ding, Newburgh, IN (US); Tukaram Gunale, Bangalore (IN)

(73) Assignee: SABIC GLOBAL TECHNOLOGIES B.V. (NL)

( * ) Notice: Subject to any disclaimer, the term of this patent is extended or adjusted under 35 U.S.C. 154(b) by 34 days.

This patent is subject to a terminal disclaimer.

(21) Appl. No.: 13/950,900

(22) Filed: Jul. 25, 2013

(65) Prior Publication Data

US 2014/0031440 A1 Jan. 30, 2014

Related U.S. Application Data

(60) Provisional application No. 61/677,231, filed on Jul. 30, 2012.

(51) Int. Cl.
*C08L 67/02* (2006.01)
*C08G 63/85* (2006.01)
*C08K 5/103* (2006.01)
(Continued)

(52) U.S. Cl.
CPC ............ *C08L 67/02* (2013.01); *C08G 63/183* (2013.01); *C08G 63/85* (2013.01); *C08J 11/16* (2013.01); *C08J 11/24* (2013.01); *C08K 3/0041* (2013.01); *C08K 5/103* (2013.01); *C08K 5/372* (2013.01); *C08L 69/00* (2013.01); *C08J 2367/02* (2013.01)

(58) Field of Classification Search
CPC ...... C08L 67/02; C08G 63/85; C08G 63/183; C08K 3/0041; C08J 11/16; C08J 11/24; C08J 2367/02; C07C 63/26
USPC ................. 521/40, 48, 48.5; 528/272, 308.6; 264/328.1; 524/599, 601, 604, 605
See application file for complete search history.

(56) References Cited

U.S. PATENT DOCUMENTS 4,096,156 A 6/1978 Freudenberger et al.
4,328,059 A 5/1982 Horlbeck et al.
(Continued)

FOREIGN PATENT DOCUMENTS

EP 1437377 A1 10/2002
WO 2007089747 A1 8/2007
WO 2013033285 A1 3/2013

OTHER PUBLICATIONS

International Searching Authority, International Search Report, PCT/US2013/052060, Date of mailing: Oct. 14, 2013, 5 pages.
(Continued)

*Primary Examiner* — Frances Tischler
(74) *Attorney, Agent, or Firm* — Cantor Colburn LLP (57) ABSTRACT

A process of preparing a modified polyalkylene terephthalate by melt polycondensation comprising reacting an alkylene diol and polyethylene terephthalate, wherein polymerization occurs in the presence of a catalyst complex formed by reaction of tetra(alkyl) titanate and a compound selected from phosphorus-containing compounds, nitrogen-containing compounds, boron-containing compounds, and combinations thereof.

22 Claims, 4 Drawing Sheets (51) Int. Cl.
*C08K 5/372* (2006.01)
*C08L 69/00* (2006.01)
*C08K 3/00* (2006.01)
*C08J 11/16* (2006.01)
*C08J 11/24* (2006.01)
*C08G 63/183* (2006.01)

(56) References Cited

U.S. PATENT DOCUMENTS

| | | | |
|---|---|---|---|
| 5,266,601 A | 11/1993 | Kyber et al. | |
| 5,451,611 A | 9/1995 | Chilukuri et al. | |
| 6,020,393 A | 2/2000 | Khemani | |
| 6,066,714 A * | 5/2000 | Putzig et al. | 528/279 |
| 6,303,738 B1 | 10/2001 | Putzig et al. | |
| 7,129,301 B2 | 10/2006 | Wu et al. | |
| 7,799,836 B2 | 9/2010 | Agarwal et al. | |
| 7,902,263 B2 * | 3/2011 | Agarwal et al. | 521/40 |
| 8,138,233 B2 | 3/2012 | Agarwal et al. | |
| 2004/0254330 A1 * | 12/2004 | Duan et al. | 528/275 |
| 2005/0113534 A1 | 5/2005 | Agarwal et al. | |
| 2007/0208160 A1 | 9/2007 | Agarwal et al. | |
| 2009/0275698 A1 | 11/2009 | Ravi et al. | |
| 2010/0168336 A1 * | 7/2010 | Cohoon-Brister | 525/186 |
| 2011/0071235 A1 | 3/2011 | Kannan et al. | |

OTHER PUBLICATIONS

JP 60-147430, Publish date: Aug. 3, 1985, Abstract, 1 page.
International Searching Authority, Written Opinion, PCT/US2013/052060, Date of mailing: Oct. 14, 2013, 7 pages.

* cited by examiner

METHOD FOR THE PREPARATION OF MODIFIED POLY(ALKYLENE TEREPHTHALATE) EMPLOYING IN SITU TITANIUM-CONTAINING CATALYST

CROSS REFERENCE TO RELATED APPLICATIONS

This application claims priority to U.S. Provisional Application Ser. No. 61/677,231 filed on Jul. 30, 2012, which is incorporated herein by reference in its entirety.

BACKGROUND

This disclosure relates to a method for the manufacture of a polyalkylene terephthalate such as polybutylene terephthalate from recycled polyethylene terephthalate. In particular, the method comprises employing a titanium-containing catalyst formed by the reaction product of tetraalkyl titanate and a complexing agent comprising a phosphorous, nitrogen or boron atom.

Polybutylene terephthalate (PBT) is a well-known resin that is semi-crystalline and has several desirable properties. Compared to amorphous resins such as acrylonitrile butadiene styrene (ABS), polycarbonate, and polystyrene, a crystalline resin like PBT will show greater solvent resistance, strength, and stiffness, due to the presence of crystalline spherulites in the resin. PBT resin is used in many applications where its solvent resistance, strength, rigidity, and rigidity are needed, commonly in durable goods that are formed by injection molding.

Applications include electronic and communications equipment, computers, televisions, kitchen and household appliances, industrial equipment, lighting systems, gardening and agricultural equipment, pumps, medical devices, food handling systems, handles, power and hand tools, bobbins and spindles, and automotive parts in both under-the-hood and exterior applications. Additionally, PBT is very widely used to form electrical connectors. Through its many blended products, PBT can be tailored to a wide variety of applications.

Although useful to many customers, conventional PBT molding compositions generally cannot be made from recycled sources of PBT due to the lack of availability of large post-consumer or post-industrial supplies of PBT scrap materials. Polyethylene terephthalate (PET), unlike PBT, is made in much larger quantities and is more easily recovered from consumer wastes or the like.

With increasing demand for conserving non-renewable resources and more effectively recycling underutilized scrap PET, improved and less costly processes for deriving PBT or other polyalkylene terephthalates from scrap PET materials have been sought, in particular if the resulting derived polyalkylene terephthalate compositions possess desirable physical properties such as tensile strength, impact strength, and thermal properties.

Polyalkylene terephthalate made from recycled or scrap PET is herein referred to as "modified polyalkylene terephthalate," including "modified PBT," wherein the polymer is modified by containing at least one residue derived from the polyethylene terephthalate component used in the process. The residue can be either incorporated into the structure of the polymer or present in admixture with the resin composition. Thus, the modified polyalkylene terephthalates can identifiably differ slightly from virgin PBT by such modifications which, however, can be controlled so that the modified PBT has desirable properties comparable or similar to virgin PBT with little or no adverse effects.

The modified polyalkylene terephthalate can generally be made by reacting alkylene diol such as 1,4-butanediol with polyethylene terephthalate (PET) particulates, for example flakes, in the presence of a transesterification catalyst. U.S. Pat. Nos. 7,129,301; 6,020,393; 4,328,059, and US Patent Pub. 2005/0113534 A1 disclose various catalysts for the polymerization of polyesters. Tetraalkyl titanates have been commonly used as catalysts for PBT polymerization. The various titanates can include tetraisopropyl titanate, tetrabutyl titanate, and tetra(2-ethylhexyl) titanate. JP 60147430 discloses a method of producing polyester by esterifying terephthalic acid, adipic acid and 1,4-butanediol in the presence of titanium compound and a pentavalent phosphorus compound. U.S. Pat. No. 6,303,738 B1 discloses a process for producing copolyester containing adipic acid in the presence of TYZOR IAM (available from DuPont), which was prepared through the combination of TPT (tetraisopropyl titanate) and a mixture of butyl phosphate and dibutyl phosphate. These catalysts, however, have not been used for the production of modified polyalkylene terephthalates from PET.

At the end of the polymerization process, the catalyst employed for the polymerization of the polyalkylene terephthalate is typically not quenched (deactivated) in the resulting resin composition. Unfortunately, an active catalyst in the resin composition can sometimes lead to undesirable reactions in subsequent processing of the modified polyalkylene terephthalate. Blends containing the modified polyalkylene terephthalate, on exposure to high temperature and humidity, can exhibit hydrolytic degradation, especially under caustic conditions. Another problem associated with some blends is transesterification, which can lead to loss of mechanical properties. Catalyst quenchers can be added to thermoplastic compositions to prevent such transesterification, but such catalyst quenchers can also promote degradation of polymer chains and contribute to a decrease in hydrolytic stability. Conventional phosphorous derivatives such as phosphoric acid, phosphates have been used as quenchers. The use of phosphite stabilizers is less satisfactory because of the tendency to be unstable to both hydrolysis and oxidation.

Insufficient hydrostability can lead to chain cleavage, to which extent depending on the exact conditions of exposure to water or humidity. Temperature, time of exposure, and pH are all factors. Both acids and bases can catalyze ester hydrolysis. If the water is acidic or basic, or the polymer matrix involves free acidic or basic additives, decomposition can be accelerated. Since one of the reaction products of polyalkylene terephthalates hydrolysis is itself a carboxylic acid, the hydrolytic decomposition of a polyalkylene terephthalates such as PBT is autocatalytic.

Thus, there remains a need for new and improved catalysts or synthetic approaches for the production of polyalkylene terephthalates that are effective in polymerization, but which do not have adverse effects in the resin composition, during later processing or in polymer blends, after polymerization has been completed.

BRIEF DESCRIPTION OF THE INVENTION

The present invention is directed to a novel synthetic approach for preparing a modified polyalkylene terephthalate such as polybutylene terephthalate by employing a catalyst that is the reaction product of a tetraalkyl titanate and a compound selected from phosphorus-containing compounds, nitrogen-containing compounds, boron-containing compounds, and combinations thereof. The catalyst, which can be synthesized in-situ, is present during depolymerization of the polyethylene terephthalate starting material, ester interchange with an alkylene diol, and subsequent polymerization of the modified PBT.

In an embodiment, a process of preparing a modified polyalkylene terephthalate from recycled polyethylene terephthalate comprises forming a catalyst consisting of the reaction product of tetra($C_1$-$C_8$ alkyl) titanate and a complexing agent selected from the group phosphorus-containing compounds, a nitrogen-containing compounds, a boron-containing compound, and combinations thereof, wherein the molar ratio of the complexing agent to the tetra($C_1$-$C_8$ alkyl) titanate is from 0.05 to less than or equal to 2:1; depolymerizing the polyethylene terephthalate by combining the polyethylene terephthalate, in the presence of the catalyst, with a dihydric alcohol selected from the group $C_2$-$C_4$ alkylene diols to obtain a molten mixture; and polymerizing the molten mixture in the continued presence of the catalyst and $C_3$-$C_{20}$ alkylene diol, which alkylene diol is added during or after depolymerization such that the same or different alkylene diol can be present during depolymerization and polymerization, thereby yielding a modified polyalkylene terephthalate.

Another embodiment of the invention is directed to a process of preparing a modified polyalkylene terephthalate from recycled polyethylene terephthalate, which process comprises forming a catalyst consisting of the reaction product of tetra($C_1$-$C_8$ alkyl) titanate and a complexing agent selected from the group phosphorus-containing compounds, nitrogen-containing compounds, boron-containing compounds, and combinations thereof, wherein the molar ratio of the complexing agent to the tetra($C_1$-$C_8$ alkyl) titanate is from 0.05 to less than or equal to 2:1, depolymerizing polyethylene terephthalate by combining, and subjecting to heat, the polyethylene terephthalate, in the presence of the catalyst, with a first dihydric alcohol that is selected from the group $C_2$-$C_4$ alkylene diols, and combinations thereof, to thereby obtain a molten depolymerized mixture; adding a second dihydric alcohol to the molten depolymerized mixture selected from the group $C_3$-$C_4$ alkylene diols, which second dihydric alcohol is different than the first dihydric alcohol, to thereby obtain a second molten depolymerized mixture; and polymerizing the second molten mixture in the continued presence of the catalyst.

In yet another embodiment, a process of preparing a modified polybutylene terephthalate from recycled polyethylene terephthalate by melt polycondensation comprises:

forming a catalyst solution comprising a catalyst that is the reaction product of tetra($C_1$-$C_8$ alkyl) titanate and a phosphorus-containing compound, which catalyst is synthesized in situ, prior to depolymerization of the polyethylene terephthalate, by combining, at an elevated first temperature, the tetra ($C_1$-$C_8$ alkyl) titanate and phosphorous-containing compound in butanediol and/or ethylene glycol, wherein the catalyst is formed employing a complexing agent acid:tetraisopropyl titanate molar ratio of 0.1:1 to 1.2:1;

forming a catalyzed reactant mixture by combination the catalyst solution with polyethylene terephthalate, optionally with additional butanediol and/or ethylene glycol, and subjecting the catalyzed reactant mixture to heat to obtain substantially complete depolymerization and ester interchange at an elevated second temperature to form a depolymerized mixture;

subjecting the depolymerized mixture to heat to melt residual particles of polyethylene terephthalate at an elevated third temperature higher than the second temperature to obtain a molten depolymerized mixture;

polymerizing the molten depolymerized mixture under vacuum, in the presence of butanediol added following depolymerization if not before, by subjecting the molten depolymerized mixture to vacuum under heat, optionally with distillation, at a pressure of less than 2 Torr and a temperature of 220° C. to 270° C.; and stopping the polymerization when obtaining a modified polybutylene terephthalate having a number average molecular weight of at least 15,000 g/mol.

In still another embodiment, a process comprises forming a compounded thermoplastic composition by blending, based on the total weight of the thermoplastic composition:

from more than 50 to 99.99 wt. %, based on the total weight of the modified polyalkylene resin composition made by one of the foregoing inventive processes;

from 0 to 50 wt. %, based on the total weight of the composition, of filler;

from 0 to 20 wt. % of an impact modifier or other polymer; and from 0.01 to 5 wt. %, based on the total weight of the composition, of at least one additive selected from a nucleating agent, antioxidant, UV stabilizer, plasticizer, epoxy compound, melt strength additive, or a combination thereof, crosslinker, and combinations thereof, wherein essentially no quencher for the catalyst complex is added to the compounded thermoplastic composition; and extruding, calendaring, extrusion molding, blow molding, solvent casting, or injection molding of thermoplastic composition.

The present process solves the problem in the prior art regarding undesirable post-polymerization catalytic activity. In particular, use of an in situ titanium-based catalyst complex according to the present process can improve hydrolytic stability of the poly(alkylene) terephthalate resin and blends thereof by reducing or eliminating transesterification reactions in later processing, especially in blends susceptible to transesterification. Furthermore, use of the catalyst allows the beneficial exclusion of catalyst quenchers in thermoplastic compositions containing the polyalkylene terephthalate resin composition, for example, during the addition of additives and during extrusion. Such thermoplastic compositions can, therefore, show improved properties under conditions that can otherwise promote transesterification or hydrolytic degradation of the thermoplastic composition.

These and other features, aspects, and advantages will become better understood with reference to the following description and appended claims.

DETAILED DESCRIPTION OF THE INVENTION

Our invention is based on the discovery that it is now possible to produce polyalkylene terephthalate from polyethylene terephthalate feedstock (including recycled polyethylene terephthalate) and a selected group of diols in the presence of a novel titanium-containing catalyst complex comprising the reaction of tetraisopropyl titanate with a complexing agent selected from the group phosphorus-containing compounds, nitrogen-containing compounds, boron-containing compounds, and combinations thereof.

As used herein the singular forms "a," "an," and "the" include plural referents. The term "combination" is inclusive of blends, mixtures, alloys, reaction products, and the like. Unless defined otherwise, technical and scientific terms used herein have the same meaning as is commonly understood by one of skill. Compounds are described using standard nomenclature. The term "and a combination thereof" is inclusive of the named component and/or other components not specifically named that have essentially the same function.

Other than in the operating examples or where otherwise indicated, all numbers or expressions referring to quantities of ingredients, reaction conditions, and the like, used in the specification and claims are to be understood as modified in all instances by the term "about." Various numerical ranges are disclosed in this patent application. Because these ranges are continuous, they include every value between the minimum and maximum values. The endpoints of all ranges reciting the same characteristic or component are independently combinable and inclusive of the recited endpoint. Unless expressly indicated otherwise, the various numerical ranges specified in this application are approximations. The term "from more than 0 to" an amount means that the named component is present in some amount more than 0, and up to and including the higher named amount.

All ASTM tests and data are from the 2003 edition of the Annual Book of ASTM Standards unless otherwise indicated.

With respect to the terms "terephthalic acid group" and "isophthalic acid group" ("diacid groups") or "ethylene glycol group," "butanediol group," and "diethylene glycol group" ("diol groups) being used to indicate, for example, the weight percent (wt. %) of the group in a molecule, the term "isophthalic acid group(s)" means the group or residue of isophthalic acid having the formula (—O(CO)$C_6H_4$(CO)—), the term "terephthalic acid group" means the group or residue of isophthalic acid having the formula (—O(CO)$C_6H_4$(CO)—), the term "diethylene glycol group" means the group or residue of diethylene glycol having the formula (—O($C_2H_4$)O($C_2H_4$)—), the term "butanediol group" means the group or residue of butanediol having the formula (—O($C_4H_8$)—), the term "ethylene glycol group" means the group or residue of ethylene glycol having the formula (—O($C_2H_4$)—), and the term "cyclohexanedimethanol group" means the reside of cyclohexanedimethanol having the formula (—O$CH_2$($C_6H_{10}$)—$CH_2$O—).

The term "recycle" as used herein refers to any component that has been manufactured and either used or intended for scrap. Thus, a recycle polyester can be polyester that has been used, for example in drinking bottle, or that is a byproduct of a manufacturing process, for example that does not meet a required specification and therefore would otherwise be discarded or scrapped. Recycle materials can therefore contain virgin materials that have not been utilized.

The prefix "bio-" or "bio-derived" as used herein means that the compound or composition is ultimately derived (by humans) from a biomass or biological source, e.g., "bio-1,3-propane diol" is derived from a biological (e.g., plant or microbial source) rather than a petroleum source. Similarly, the prefix "petroleum-" or "petroleum-derived" means that the compound or composition is ultimately derived from a petroleum source, e.g., a "petroleum-derived polyethylene terephthalate is derived from reactants that are themselves derived from petroleum.

The term "biomass" means living or dead biological matter that can be directly or subsequently converted to useful chemical substances that are ordinarily derived from non-renewable hydrocarbon sources. Biomass can include cellulosic materials, grains, starches derived from grains, fatty acids, plant based oils, as well as derivatives from these biomass examples. Examples of useful chemical substances include and are not limited to diols and monomers used to make diols. Biomass based butane diol can be obtained from several sources. For instance, the following process can be used to obtain biomass-based 1,4-butanediol. Agriculture based biomass, such as corn, can be converted into succinic acid by a fermentation process that also consumes carbon dioxide. Succinic acid from biomass is commercially available from several sources such as from Diversified Natural Products Inc. under the trade name BioAmber™. This succinic acid can be easily converted into 1,4-butanediol by processes described in several published documents such as in U.S. Pat. No. 4,096,156, incorporated herein in its entirety. Another process that describes converting succinic acid into 1,4-butanediol is described in Life Cycles Engineering Guidelines by Smith et al., EPA publication EPA/600/R-1/101 (2001).

The term "modified polyalkylene terephthalate" as used herein refers to polymers in which at least 90 mol %, specifically at least 95 mol %, more specifically at least 98 mol %, most specifically essentially 100 mol % of the diacid groups in the modified polyalkylene terephthalate are isophthalic and/or terephthalic acid groups, specifically terephthalic groups. Thus, modified polyalkylene terephthalates comprises diacid groups of which no more than 10 mol %, specifically no more than 5 mol %, more specifically no more than 2 mol %, and most specifically essentially zero mol %, are adipic acid groups. In an embodiment, the modified polyalkylene terephthalate can include cyclohexanedimethanol groups, whereas in a second embodiment the modified polyalkylene terephthalate comprises diol groups of which no more than 2 mol % are cyclohexanedimethanol groups, specifically essentially zero mol % are cyclohexanedimethanol groups. In an embodiment, at least 90 mol % of the diacid groups in the modified polyalkylene terephthalate are terephthalic acid groups derived from the polybutylene terephthalate and at least 90 mol % of the diol groups in the modified polybutylene terephthalate are butanediol groups.

In general, processes for preparing polyesters by depolymerizing aromatic polyesters in the presence of polyols are known in the art. For example, U.S. Pat. No. 5,451,611 describes a process for converting waste polyethylene terephthalate (PET) to either poly(ethylene-co-butylene terephthalate) or polybutylene terephthalate by reaction with butanediol. Example 11 of U.S. Pat. No. 5,451,611 patent shows a PBT polymer being formed with a complete replacement of ethylene glycol by butanediol. U.S. Pat. No. 5,266,601 and U.S. Pat No. 20090275698 (A1) describe a process for making PBT from PET by reacting PET with butanediol.

The present process of preparing a modified polyalkylene terephthalate, by melt polycondensation, comprises reacting an alkylene diol and polyethylene terephthalate, wherein polymerization occurs in the presence of a catalyst complex formed by reaction of a tetra($C_1$-$C_8$ alkyl) titanate such as tetraisopropyl titanate and a complexing agent selected from phosphorus-containing compounds, nitrogen-containing compounds, boron-containing compounds, and combinations thereof. The catalyst can be synthesized in situ, prior to depolymerisation of the polyethylene terephthalate, by adding the components of the catalyst to a solution comprising alkylene diol used in the process.

The titanium catalyst comprises the reaction product of a tetra($C_1$-$C_8$ alkyl) titanate such as tetraisopropyl titanate and a reactant selected from:

(1) phosphorus-containing compounds, at a molar ratio of the phosphorus-containing compound:titanate from 0.05:1 to less than or equal to 2:1, specifically 0.2:1 to 1.6:1, more specifically 0.3:1 to 1.4:1, most specifically 0.5:1 to 1.2:1, (2) nitrogen-containing compounds, at a molar ratio of the nitrogen-containing compound:titanate from 0.05:1 to less than or equal to 2:1, specifically 0.2:1 to 1.2:1, more specifically 0.3:1 to 1.2:1, most specifically 0.5:1 to 1.2:1, (3) boron-containing compounds, at a molar ratio of the boron-containing compound:titanate from 0.05:1 to less than or equal to 2:1, specifically 0.2:1 to 1.2:1, more specifically 0.3:1 to 1.2:1, most specifically 0.5:1 to 1.2:1, and (4) combinations thereof.

Phosphorus-containing compounds include phosphoric acid, poly(phosphoric acid), phosphorous acid, monoalkyl phosphates such as monobutyl phosphate, dialkyl phosphates dibutyl phosphate, and combinations thereof.

Nitrogen-containing compounds include alkyl amines, aromatic amines, alkyl aromatic amines, alkanol amines, ammonium compounds, and combinations thereof.

Boron-containing compounds include boric acid, boron alkoxides, boric oxides, boron halides, metaborates, monoalkyl borates, dialkyl borates, trialkyl borates, borazines, and combinations thereof.

In regard to these complexing agents, alkyl groups specifically can be $C_1$ to $C_{12}$, specifically $C_2$ to $C_6$ alkyl groups, more specifically $C_1$ to $C_3$ alkyl groups. The term "alkyl" refers to branched or straight chain monovalent saturated groups. An alkanol can have an analogous number of carbon atoms. Aromatic compounds have at least one, specifically one, two or three $C_6$-$C_{12}$ aryl groups (for example phenyl, naphthyl, or the like) containing only carbon in the aromatic ring, optionally substituted. Exemplary substituents can include halogen, cyano, nitro, hydroxyl, alkyl, alkoxy, arylalkoxy, and combinations thereof.

In an embodiment, the titanium-containing catalyst comprises the reaction product of tetra($C_1$-$C_8$ alkyl) titanate, specifically tetraisopropyl titanate, and a phosphorous-containing compound, specifically phosphoric acid, at a molar ratio of the phosphorous-containing compound: tetra($C_1$-$C_8$ alkyl) titanate, specifically at a molar ratio of phosphorous acid: tetraisopropyl titanate from more than 0.15:1, specifically from more than or equal to 0.3:1, to less than or equal to 1.2:1. Modified polybutylene terephthalate of good quality and properties can be produced with this catalyst, in which the properties are similar to, or essentially the same, virgin polybutylene terephthalate.

Specifically, the phosphorous-containing compound can be a compound in which the phosphorus atom is bound to four oxygen atoms, more specifically a compound that is not a metallic salt. Thus, the catalyst can be the reaction product of a tetraalkyl titanate and a phosphorous-containing compound in which less than 50 mol %, specifically less than 25 mol %, more specifically essentially none, of the phosphorous-containing compound is associated with a metallic ion, specifically Li, Na, K, Ca, Mg, Ba, Zn, or mixtures thereof. The phosphorous-containing compound comprises only one phosphorous atom per molecule. Thus, the formation of chelating ligands can be excluded in preparing the catalyst. In an embodiment, phosphonate and phosphonic acid compounds are excluded.

In particular, the present process can comprise forming a catalyst in situ by combining a tetra($C_1$-$C_8$ alkyl) titanate such as tetraisopropyl titanate with a complexing agent such as phosphoric acid and an alkylene diol, prior to addition of the polyethylene terephthalate starting material. By "in situ" is meant that the catalyst, a titanium complex, is not premade but is formed during the process in the presence of one or more components of the process. Thus, the catalyst is present during the repolymerization reactions, including both the depolymerization and the polymerization to yield the modified polyalkylene terephthalate final product. Specifically, the catalyst complex can be made within one week, specifically within 24 hours, more specifically within 12 hours, prior to the depolymerization stage of the process.

In preparing the catalyst, the tetra($C_1$-$C_8$ alkyl) titanate, for reaction with the complexing agent, can be provided in a total amount of 25 to 1000 ppm, based on the total weight of the reaction composition. The catalyst can be present in the process, during depolymerization and polymerization, in the amount of 10 to 1000 ppm, specifically 25 to 500 ppm, more specifically 35 to 250 ppm, most specifically 45 to 200 ppm titanium (Ti), based on total composition, as well as in the final product composition.

The catalyst solution can be heated to an elevated first temperature. The catalyst solution can then be combined with polyethylene terephthalate, optionally with further alkylene diol, to obtain a catalyzed reactant mixture. The catalyzed reactant mixture can be subjected to heat to obtain substantially complete depolymerization and ester interchange at an elevated second temperature, typically in the range of 170-230° C., specifically 180 to 220° C., which is typically higher than the first temperature. Such depolymerization can be carried out at a pressure of at least about atmospheric pressure under an inert atmosphere, for example, under nitrogen.

Specifically, in the preparation of polybutylene terephthalate, the polyethylene terephthalate component can be reacted with 1,4-butanediol and/or ethylene glycol under inert atmosphere and under conditions that are sufficient to depolymerize the polyethylene terephthalate component into a molten mixture containing oligomers containing ethylene terephthalate moieties, oligomers containing ethylene isophthalate moieties, oligomers containing diethylene terephthalate moieties, oligomers containing diethylene isophthalate moieties, oligomers containing butylene terephthalate moieties, oligomers containing butylene isophthalate moieties, covalently bonded oligomeric moieties containing at least two of the foregoing moieties, and/or the like. Polyester moieties and 1,4-butanediol and/or ethylene glycol can be combined in the molten phase under agitation, and the 1,4-butanediol and/or ethylene glycol can be continuously refluxed back into the reactor during depolymerization. In an embodiment, 1,4-butanediol and/or ethylene glycol is refluxed back into the reactor during depolymerization while excess butanediol, ethylene glycol and tetrahydrofuran are removed during or after depolymerization. In an embodiment, ethylene glycol can be used for depolymerizing polyethylene terephthalate and a different diol (for example, $C_{3-8}$ alkylene diol) can be used for the subsequent polymerization. In a second embodiment, the same alkylene diol, exclusive of ethylene glycol, can be used for both depolymerization and polymerization.

The polyethylene terephthalate component and the 1,4-butanediol and/or ethylene glycol component can be combined under atmospheric pressure. In another embodiment, however, it is possible to use pressures that are higher than atmospheric pressures. For instance, in an embodiment, the pressure under which the polyethylene terephthalate component and the 1,4-butanediol and/or ethylene glycol are subjected is 2 atmospheres or higher.

The temperature at which the polyethylene terephthalate component and the 1,4-butanediol and/or ethylene glycol component are combined and reacted is sufficient to promote depolymerization of the polyethylene terephthalate component into polyethylene terephthalate and polybutylene terephthalate oligomers, 1,4-butanediol, and ethylene glycol. The 1,4-butanediol and/or ethylene glycol is generally used in excess amount relative to the polyethylene terephthalate, for example recycled PET scrap. In an embodiment, 1,4-butanediol and/or ethylene glycol is used in a molar excess amount ranging from 2 to 20 mol %.

The duration of the time in which recycled PET reacts with 1,4-butanediol and/or ethylene glycol can vary, depending on factors, such as available equipment, production needs, desired final properties, and the like. In an embodiment, the depolymerization is carried out for at least 30 minutes. In another embodiment, it is carried out for about 2 to 5 hours.

Once a molten mixture forms, the molten mixture can be placed in subatmospheric pressure conditions at a suitable temperature for a period of time that is sufficiently long for the molten mixture to polymerize into a PET-derived modified PBT polymer.

The subatmospheric conditions can include a pressure of less than 2 Torr, specifically less than 1 Torr. Advantageously, the molten mixture can be placed under subatmospheric conditions without isolation and dissolution of any material from the molten mixture. The temperature at which the molten mixture is placed under subatmospheric conditions is sufficiently high to promote polymerization of the polyethylene terephthalate and polybutylene terephthalate oligomers, 1,4-butanediol, and ethylene glycol to the PET-derived modified PBT ("elevated temperature"). Generally, the temperature is at least 220° C. In an embodiment, the temperature ranges from 220° C. to 275° C., specifically 240 to 270° C.

During the time when the molten mixture is placed under subatmospheric conditions and the temperature is increased, excess butanediol, ethylene glycol and THF can be removed from the reactor and oligomers allowed to build up molecular weight. Agitation can be continuously provided to facilitate the removal of the low boiling components. After sufficient molecular weight is obtained, the molten PBT polymer can be dropped from the reactor, cooled, stranded, and chopped into pellets.

The duration of polymerization, discussed above (in which the molten mixture polymerizes from polyethylene terephthalate and polybutylene terephthalate oligomers, 1,4-butanediol, and ethylene glycol) can vary, depending on factors such as equipment available, production needs, desired final properties, and the like. In an embodiment, polymerization is carried out for at least two hours. In another embodiment, the step is carried out for at least 30 minutes, specifically from 2 to 5 hours.

The process for making a PET-derived modified PBT component can include reducing the amount of THF produced during the process by adding to the reactor, during polymerization, a basic compound, containing an alkali metal, or an epoxide. Such methods are disclosed in co-assigned U.S. Pat. Nos. 8,138,233 and 7,799,836, both hereby incorporated by reference in their entirety.

The process for making the PET-derived modified PBT may contain an additional stage in which the PBT formed from the molten mixture is subjected to solid-state polymerization. In an embodiment, polymerization of the molten depolymerized mixture is carried out under vacuum by subjecting the depolymerized mixture to vacuum under heat, optionally with distillation, at a pressure of less than 2 Torr and a temperature of 220° C. to 270° C. until an intrinsic viscosity of 0.4 to 0.6 is obtained and then initiating solid state polymerization at a temperature of 200° C. to 220° C.

Solid-state polymerization generally involves subjecting the PBT formed from the molten mixture to an inert atmosphere and heating to a temperature for a sufficient period of time to build the molecular weight of the PBT. Generally, the temperature to which the PBT is heated is below the melting point of the PBT, e.g., from 5° C. to 60° C. below the melting point of the PBT. In an embodiment, such a temperature may range from 150° C. to 210° C. Suitable periods of time during which the solid-state polymerization occurs may range from 2 to 20 hours, depending on the conditions and equipment. The solid-state polymerization is generally carried out under tumultuous conditions sufficient to promote further polymerization of the PBT to a suitable molecular weight. Such tumultuous conditions may be created by subjecting the PBT to tumbling, the pumping of inert gas into the system to promote fluidization of polymer particle, e.g., pellets, chips, flakes, powder, and the like. The solid-state polymerization can be carried out at atmospheric pressure and/or under reduced pressure, e.g. from 1 atmosphere to 1 mbar.

By way of illustration, a titanium-containing catalyst can be made in accordance with the present process by reacting in situ a tetra($C_1$-$C_8$ alkyl) titanate such as tetraisopropyl titanate with a phosphorous-containing compound such as phosphoric acid, as shown by the following schematic representation:

Titanium Isopropoxide    Phosphoric Acid

-continued

As illustrated by this schematic representation, the in-situ reaction between phosphoric acid and tetraisopropyl titanate in diol solvent (for example, butanediol) can achieve complete conversion in the reaction between the most acidic hydroxyl group of the phosphoric acid and tetraisopropyl titanate. Without wishing to be bound by theory, it is believed that once all strongly acidic hydroxyl groups are consumed, polymerization can be conducted without inhibition. After the catalyst preparation, the catalyst components and the polyethylene terephthalate can be introduced into a reactor and the reaction temperature can be increased, for example to 220° C., to complete depolymerization and ester interchange, followed by polymerization, for example at 250° C.

In still another embodiment, the invention includes a process for making PTT (polytrimethylene terephthalate) that involves reacting a polyethylene terephthalate component with a 1,3-propanediol at a pressure that is at least atmospheric pressure in the presence of a catalyst component at a temperature ranging from 180° C. to 260° C., under an inert atmosphere, thereby depolymerizing the polyethylene terephthalate component into a molten mixture containing polyethylene terephthalate oligomers, polypropylene terephthalate oligomers, 1,3-propanediol, and ethylene glycol and/or combinations thereof. The polyethylene terephthalate component and the 1,3-propanediol can be combined in the molten phase under agitation and the 1,3 propanediol refluxed back into the reactor, thereby forming a PET-derived PTT.

The polyethylene terephthalate (PET) component of the process includes recycle (scrap) PET in flake, powder/chip, film, or pellet form. Before use, the PET is generally processed to remove impurities such as paper, adhesives, polyolefin, e.g., polypropylene, polyvinyl chloride (PVC), nylon, polylactic acid (an aliphatic polyester), and other contaminants.

The process of preparing the polyalkylene terephthalate can be a "two-stage" process in which the same alkylene diol, for incorporation into the polyalkylene terephthalate, is added for both the depolymerization and polymerization stages. Alternatively, a "three-stage" process in which in which a first dihydric alcohol is used for depolymerization and a second dihydric alcohol, wherein the first dihydric alcohol and second dihydric alcohol are different, is used for polymerization and incorporated into the polyalkylene terephthalate.

For example, in a three-stage process, the first dihydric alcohol can be any $C_2$-$C_4$ alkylene diol that reacts with the PET to depolymerize the polyethylene terephthalate. Examples of suitable first dihydric alcohols are alkylene diols that can include ethylene glycol, 1,2-propylene glycol, 1,3-propylene glycol, 1,2-butanediol, 2,3-butanediol, 1,4-butanediol, and combinations thereof. In an embodiment, the first dihydric alcohol is selected from 1,4-butanediol, 1,3-propanediol, ethylene glycol, and combinations thereof.

The second dihydric alcohol can be any $C_3$-$C_4$ alkylene diol that reacts with the product of depolymerization in the polymerization of the polyalkylene terephthalate. Examples of a suitable second dihydric alcohol can include 1,2-propylene glycol, 1,3-propylene glycol, 1,2-butanediol, 2,3-butanediol, and 1,4-butanediol. For example, the first alkylene diol can be 1,4-butanediol, 1,3-propanediol, ethylene glycol, or combinations thereof and the second alkylene diol can be diethylene glycol, 1,3-propanediol, 1,4-butanediol, or combinations thereof. For example, the first dihydric alcohol can be one or more alkylene diols that do not comprise butanediol and the second dihydric alcohol can be 1,4-butanediol.

In a two-stage process of preparing a modified PBT, a 1,4-butanediol component can react with a polyethylene terephthalate starting material under conditions that depolymerize the polyethylene terephthalate, and a molten mixture of the depolymerized product can be placed under subatmospheric conditions to produce the modified polybutylene terephthalate random copolymer. In a three-stage reaction of preparing a modified PBT, a diol component selected from the group ethylene glycol, propylene glycol, and combinations thereof can react with a polyethylene terephthalate component under conditions sufficient to depolymerize the polyethylene terephthalate component into a first molten mixture; and the first molten mixture can be combined with 1,4-butanediol under conditions that creates a second molten mixture that is subsequently placed under subatmospheric conditions to produce a modified polybutylene terephthalate random copolymer.

The polyalkylene terephthalate prepared by the present process is a random polymer that can have a number average molecular weight of at least 10,000 g/mol, specifically at least 15,000 g/mol, and a polydispersity index from 2 to less than 6, specifically 2 to 5. In an embodiment, the modified polyalkylene terephthalate, specifically a modified PBT, has a melting temperature ($T_m$) ranging from 150 to 223° C., specifically 200 to 218° C., more specifically 204 to 210° C.

Specifically, recycled polyethylene terephthalate for us in the present process can be selected or characterized by any one or more, specifically all, of the following: an acetaldehyde content below 5 ppm, a moisture content below 0.5 wt. %, a halogen (specifically Br and Cl) content below 10 ppm, an iron content less than 10 ppm, a DEG or isophthalate content less that 5 wt. %, —COOH end groups in an amount below 70 meq/Kg resin, —OH end groups in an amount greater than 30 meq/Kg, a vinyl content less than 0.1%, and a PVC or PC content essentially absent (less that 10 ppm). The resulting product can be obtained and characterized by any one or more, specifically all, of the following: a $M_w$ of 10,000 to 70,000 (or IV of 0.4 to 0.9 dl/g), —COOH end groups in the amount of 5 to 40 meq/Kg resin, OH end groups in the amount of 10 to 70 meq/Kg resin, a Yellowness Index (YI) of 5.0 to 15.0, a phosphorous (P) content of 50 to 1000 ppm, a titanium (Ti) content of 10 to 200 ppm, a mole ratio of P to Ti of 4:1 to 1:1, cobalt in the amount of 10 to 100 ppm, and a DEG content in the polymer of 0.50 to 3.0 mole %.

In the present process, the final polyalkylene terephthalate can be a modified poly(trimethylene terephthalate) derived from petroleum-derived 1,3-propanediol, a modified poly(trimethylene terephthalate) derived from bio-derived 1,3-propanediol, a modified polybutylene terephthalate derived from petroleum-derived 1,4-butanediol, or a modified polybutylene terephthalate derived from bio-derived 1,4-butanediol. The content of aromatic acid groups (in particular isophthalic acid groups and terephthalic acid groups) in the polyalkylene terephthalate can vary depending on the PET used and the reaction conditions. In an embodiment the aromatic dicarboxylic acid group contains from 0.2 to 3.0 mol % of isophthalic acid group and from 90 to 99 mol % percent of terephthalic acid groups, based on the total moles of diacid groups present in the copolymer. Specifically, at least 90 mol %, specifically at least 95 mol %, more specifically at least 98 mol % or about 0 mol %, of the diacid groups in the modified polyalkylene terephthalate (specifically modified polybutylene terephthalate) are terephthalic acid, or terephthalic acid groups and isophthalic acid groups, derived from the polyalkylene terephthalate. Specifically, at least 90 mol %, specifically at least 95 mol %, more specifically at least 98 mol % or about 0 mol %, of the diol groups in the modified polyalkylene terephthalate (specifically modified polybutylene terephthalate) are an alkylene diol group derived from the dihydric alcohol used in polymerizing the modified polyalkylene terephthalate.

The polyalkylene terephthalate prepared by the present process can further comprise other residues present in the PET component, including catalyst residues from the manufacture of the PET, residues from additives in the PET, or residues arising from side reactions that occur during manufacture of the PET and/or the reaction of the first alkylene diol and the PET.

For example, residues derived from the polyethylene terephthalate component can include ethylene glycol groups, diethylene glycol groups, isophthalic acid groups, antimony-containing compounds, germanium-containing compounds, titanium-containing compounds, cobalt-containing compounds, tin-containing compounds, aluminum, aluminum salts, 1,3-cyclohexanedimethanol isomers, 1,4-cyclohexanedimethanol isomers, alkaline salts, alkaline earth metal salts, phosphorus-containing compounds and anions, sulfur-containing compounds and anions, naphthalene dicarboxylic acids, 1,3-propanediol groups, or combinations thereof. In an embodiment, the residue derived from the polyethylene terephthalate component can comprise one or more of ethylene glycol groups, diethylene glycol groups, and more particularly a combination of ethylene glycol groups and diethylene glycol groups.

The amount of the ethylene glycol groups, diethylene glycol groups, and the isophthalic groups in the polymeric backbone of the modified PBT component can vary. The PET-derived modified PBT component ordinarily contains isophthalic acid groups in an amount that is at least 0.1 mol % and can range from 0 or 0.1 to 10 mol % (0 or 0.07 to 7 wt. %). The PET-derived modified PBT component ordinarily contains ethylene glycol in an amount that is at least 0.1 mol % and can range from 0.1 to 10 mol % (0.02 to 2 wt. %). In an embodiment, the PET-derived modified PBT component has an ethylene glycol content that is more than 0.85 wt. %. The modified PBT component can also contain diethylene glycol in an amount ranging from 0.1 to 10 mol % (0.04 to 4 wt. %). The amount of the butane diol groups is generally about 98 mol % and can vary from 95 to 99.8 mol % in some embodiments. The amount of the terephthalic acid groups is generally about 98 mol % and can vary from 90 to 99.9 mole % in some embodiments. Unless otherwise specified, all molar amounts of the isophthalic acid groups and or terephthalic acid groups in a polyester are based on the total moles of diacids/diesters in the composition. Unless otherwise specified, all molar amounts of the butane diol, ethylene glycol, and diethylene glycol groups are based on the total moles of diol in the composition.

Advantageously, the present process for making PET-derived modified polyalkylene terephthalate can substantially reduce carbon dioxide emissions and solid waste. Since the modified polyalkylene terephthalate resin compositions made by the inventive process can be made from scrap PET and not monomers, the process can significantly reduce the amount of carbon dioxide emissions and solid waste. In contrast, the process to make DMT or TPA from crude oil is highly energy intensive and as a result, substantial emissions of $CO_2$ to the atmosphere can occur from burning of non-renewable energy sources. By not using DMT or TPA to make the PET-derived PBT, substantial carbon dioxide emissions savings can be obtained.

In an embodiment, a process for making PET-derived modified PBT can eliminate at least 1 kg of $CO_2$ emissions for every kilogram of PET-derived modified PBT made with the process, as compared to a process that makes virgin PBT homopolymers from monomers. Specifically, the process for making PET-derived modified PBT can eliminate from 1 kg to 1.5 kg, or more $CO_2$ emissions for every kilogram of PET-derived modified PBT made with the inventive process, as compared to a process that makes virgin PBT homopolymers from monomers. Additionally, there are energy savings/reduced carbon dioxide emissions when the ethylene glycol byproduct is recovered and is used instead of ordinary ethylene glycol in manufacturing.

Additionally, when the source of butanediol is biomass derived, using feedstocks such as succinic acid, the carbon dioxide savings can further increase. Furthermore, the fermentation to yield succinic acid requires carbon dioxide as an input, therefore leading to further carbon dioxide reductions.

Accordingly, the present process can produce a modified polybutylene terephthalate random copolymer having a reduced $CO_2$ emissions index, defined as the amount of $CO_2$, expressed in kg, that is saved when one kg of a composition containing the modified polybutylene terephthalate random copolymer is made, as compared to the amount of $CO_2$, expressed in kg, that is created when the composition is made with polybutylene terephthalate that is derived from monomers. Generally, a modified PBT random copolymer made by the present process can potentially have a reduction in $CO_2$ emissions index that is more than approximately 1.3 kg and can range from 1.3 kg to 2.5 kg.

In another aspect of the invention, the modified polyalkylene terephthalate resin composition prepared by the present process can be blended with other components to obtain a thermoplastic composition containing the resin composition. There can be compounded known substances, which are generally added to thermoplastic resins and thermosetting for the purpose of imparting desired properties corresponding to the product being made. Additives are ordinarily incorporated into polymer compositions with the proviso that the additives are selected so as to not significantly adversely affect the desired properties of the composition, for example, impact, flexural strength, color, and the like. Such additives can be mixed at a suitable time during the mixing of the components for forming the composition. Possible additives include impact modifiers, fillers, reinforcing agents, anti-oxidants, heat stabilizers, light stabilizers, ultraviolet light (UV) absorbers, plasticizers, lubricants, mold release agents, antistatic agents, colorants, blowing agents, flame retardants, anti-drip agents, and radiation stabilizers. Combinations of additives can be used, for example, an antioxidant, a UV absorber, and a mold release agent. The total amount of additives (other than any impact modifier, filler, or reinforcing agents) is generally 0.01 to 15 wt. %, based on the total weight of the composition.

In a specific embodiment, from 0.01 to 5.00 wt. % of a nucleating agent, antioxidant, UV stabilizer, plasticizer, epoxy compound, melt strength additive, or a combination thereof is used. For example, a stabilizer component is optionally present in the modified polyalkylene terephthalate resin composition, in an amount from more than 0 to 3 wt. %, specifically 0.001 to 2 wt. %, even more specifically 0.005 to 1.5 wt. %. As used herein, a "stabilizer" is inclusive of an antioxidant, thermal stabilizer, radiation stabilizer, ultraviolet light absorbing additive, and the like, and combinations thereof. In an embodiment, the stabilizer component comprises an antioxidant.

A thermoplastic composition comprising a modified polyalkylene terephthalate prepared according to the present process can be subsequently obtained that is characterized by the absence of a catalyst quencher such as an acid interchange quencher. Thus, a process according to the present invention can be further characterized by the essentially excluding (not adding) a catalyst quencher, or means for quenching the catalyst, in the thermoplastic composition containing the modified polyalkylene terephthalate resin composition.

Quenchers are agents that inhibit activity of any catalysts that can be present in a resin composition to prevent an accelerated interpolymerization and degradation of the thermoplastic. Such quenchers can be selected from the group acidic phosphate salts, acid phosphites, alkyl phosphites, aryl phosphites, mixed phosphites and combinations thereof, specifically an acidic phosphate salt; an acid phosphites, alkyl phosphites, aryl phosphites or mixed phosphites having at least one acidic hydrogen; a Group IB or Group IIB metal phosphate salt; a phosphorus oxo acid, a metal acid pyrophosphate or a mixture thereof. The acidic phosphate salts include sodium dihydrogen phosphate, mono zinc phosphate, potassium hydrogen phosphate, calcium dihydrogen phosphate, and the like. Specific quenchers are phosphoric acid, phosphorous acid or their partial esters such as mono zinc phosphate. More specifically, quenchers can include zinc phosphate, monozinc phosphate, phosphorous acid, phosphoric acid diluted in water, sodium acid pyrophosphate, tetrapropylorthosilicate, tetrakis-(2-methoxyethoxy)silane, sodium lauryl sulphate, boric acid, citric acid, oxalic acid, a cyclic iminoether containing compound, and combinations thereof.

In addition to the above-described additives, used accessorily in a small amount, depending on the object, other polymers resins, typically in an amount less than 50 weight percent, specifically less than 30 wt. %, more specifically not more than 15 wt. %, of the total composition, can be added to the thermoplastic resin composition containing the modified polyethylene terephthalate. For example, such additional polymers can include polyamides, polyphenylene sulfide, polyphenylene oxide, polyacetal, acrylonitrile-styrene resin, acrylonitrile-butadiene-styrene resin, polysulfone, polyesteramides, polyether sulfone, polyether imide, polyether ketone, fluorine resin, and combinations thereof.

In addition to modified polyalkylene terephthalate, other polyesters can optionally be present in the composition (in an amount of less than 50 weight percent, specifically less than 30 wt. %, more specifically less that 20 wt. %, most specifically less than 10 wt. % of the total composition, provided that such polyesters do not significantly and adversely affect the desired properties of the composition.

For example, a thermoplastic composition can include, in addition to the modified polyethylene terephthalate prepared by the present process, other aromatic polyesters, cycloaliphatic polyesters, and the like. The additional polyesters can be virgin polyesters or wholly or partially bio-derived, including petroleum-derived aromatic polyesters and bio-derived aromatic polyesters.

The thermoplastic composition prepared from the modified polyalkylene terephthalate can also comprises at least one reinforcing filler. For example reinforcing filler can comprise rigid fibers such as glass fibers, carbon fibers, metal fibers, ceramic fibers or whiskers such as wollastonite, polymeric fibers such as tetrafluoroethylene or aramid fibers, and the like. Glass fibers typically have a modulus of greater than or equal to about 6,800 megaPascals, and can be chopped or continuous. The glass fiber can have various cross-sections, for example, round, trapezoidal, rectangular, square, crescent, bilobal, trilobal, and hexagonal. In an embodiment, glass is preferred, especially glass that is relatively soda free. Fibrous glass filaments comprised of lime-alumino-borosilicate glass, which is also known as "E" glass are often especially preferred. Glass fiber is added to the composition to greatly increase the flexural modulus and strength, albeit making the product more brittle. The glass filaments can be made by standard processes, e.g., by steam or air blowing, flame blowing and mechanical pulling. The preferred filaments for plastic reinforcement are made by mechanical pulling. For achieving optimal mechanical properties fiber diameter between 6-20 microns can be used with a diameter of from 10-15 microns being preferred. In preparing the molding compositions it is convenient to use the fiber in the form of chopped strands of from about ⅛" (3 mm) to about ½" (13 mm) long although roving can also be used. In articles molded from the compositions, the fiber length is typically shorter presumably due to fiber fragmentation during compounding of the composition. The length of such short glass fibers present in final molded compositions is less than about 4 mm. The fibers can be treated with a variety of coupling agents to improve adhesion to the resin matrix. Preferred coupling agents include; amino, epoxy, amide, or mercapto functionalized silanes. Organometallic coupling agents, for example, titanium- or zirconium-based organometallic compounds can also be used. Other preferred sizing-coated glass fibers are commercially available from Owens Corning Fiberglass as, for example, OCF K filament glass fiber 183 F.

In another embodiment, long glass fibers can be used, wherein a continuous glass fiber bundle containing thousands of glass fiber monofilaments having a diameter in the range, 6-24 µm, specifically 8-18 µm is impregnated with melted PBT polyester. After cooling, the impregnated bundle is cut into pellets having a length of >5 mm, specifically, >9 mm, as prepared by the application of a process known as the pullout or pultrusion process. For impregnation, a high flow PCT polyester of the present invention can be used in order to improve the wetting rate of the filaments to make long glass fiber pellets. These pellets can be incorporated into the polyester compositions of the invention, to get long fiber glass-reinforced polyester compositions. The length of long glass fiber present in molded composition prepared by this method is typically greater than that prepared by incorporation of short fibers and predominant portion of the long glass fibers present have a length >4 mm in the molded part. Such long fiber glass reinforced compositions can be used for different molding techniques such as injection molding, compression molding, thermoforming and the like. As in the case of short fibers, the long fibers can also be treated with a variety of coupling agents to improve adhesion to resin. For those skilled in the art, a continuous process such as pushtrusion technique for direct incorporation of long glass fibers in high flow polyester compositions will also be possible.

The glass fibers can be blended first with the modified polyalkylene terephthalate and then fed to an extruder and the extrudate cut into pellets, or, in a preferred embodiment, they can be separately fed to the feed hopper of an extruder. In a highly preferred embodiment, the glass fibers can be fed downstream in the extruder to minimize attrition of the glass. Generally, for preparing pellets of the composition set forth herein, the extruder is maintained at a temperature of approximately 230° C. to 280° C. The pellets so prepared when cutting the extrudate can be one-fourth inch long or less. As stated previously, such pellets contain finely divided uniformly dispersed glass fibers in the composition. The dispersed glass fibers are reduced in length as a result of the shearing action on the chopped glass strands in the extruder barrel.

In some applications it can be desirable to treat the surface of the fiber, in particular a glass fiber, with a chemical coupling agent to improve adhesion to a thermoplastic resin in the composition. Examples of useful coupling agents are alkoxy silanes and alkoxy zirconates. Amino, epoxy, amide, or thio functional alkoxy silanes are especially useful. Fiber coatings with high thermal stability are preferred to prevent decomposition of the coating, which could result in foaming or gas generation during processing at the high melt temperatures required to form the compositions into molded parts.

The reinforcing filler, for example a glass fiber, is present in the composition in an amount from 5 to 50 wt. %, specifically from 10 to 45 wt. %, more specifically from 20 to 40 wt. %, and most specifically, from 25 to 35 wt. %.

In still other embodiments, the compositions can optionally additionally comprise a particulate (non-fibrous) organic filler, which can impart additional beneficial properties to the compositions such as thermal stability, increased density, stiffness, and/or texture. Exemplary particulate fillers are inorganic fillers such as alumina, amorphous silica, aluminosilicates, mica, clay, talc, glass flake, glass microspheres, metal oxides such as titanium dioxide, zinc sulfide, ground quartz, and the like.

In some embodiments, the reinforcing filler, for example glass fibers, is used in combination with flat, plate-like filler, for example talc, mica or flaked glass. Typically, the flat, plate-like filler has a length and width at least ten times greater than its thickness, where the thickness is from 1 to about 1000 microns. Combinations of rigid fibrous fillers with flat, plate-like fillers can reduce warp of the molded article. One specific particulate filler is talc, in particular a talc filler having an average largest dimension of less than 50 micrometers. In addition, or in the alternative, the filler can have a median particle size of less than 50 micrometers. In an embodiment, the equivalent spherical diameter of the particle is used to determine particle size. Use of these types of filler provides molded articles having both low shrinkage and a smooth surface finish. Use of these types of filler can also aid the crystallization of the polyester, and increase heat resistance of the composition. Such talc materials are commercially available from Barretts Minerals Inc. under the trade name ULTRATALC® 609.

When present, the particulate filler is used in an amount between zero and 20 wt. %, specifically between 0 to 10 wt. %, more specifically between 0.1 to 5 wt. %.

A thermoplastic composition can be prepared by blending the components of the thermoplastic composition employing a number of procedures. In an exemplary process, the thermoplastic composition comprising a modified polyalkylene terephthalate prepared according to the present process, an optional reinforcing filler, and any optional other polymers or additives are placed into an extrusion compounder to produce molding pellets. The components are dispersed in a matrix in the process. In another procedure, the components and reinforcing filler are mixed by dry blending, and then fluxed on a mill and comminuted, or extruded and chopped. The thermoplastic composition can also be mixed and directly molded, e.g., by injection or transfer molding techniques. Specifically, all of the components are freed from as much water as possible. In addition, compounding is carried out to ensure that the residence time in the machine is short; the temperature is carefully controlled; the friction heat is utilized; and an intimate blend between the components is obtained.

The components of the thermoplastic composition can be pre-compounded, pelletized, and then molded. Pre-compounding can be carried out in conventional equipment. For example, after pre-drying the polyester composition (e.g., for four hours at 120° C.), a single screw extruder can be fed with a dry blend of the ingredients, the screw employed having a long transition section to ensure proper melting. Alternatively, a twin screw extruder with intermeshing co-rotating screws can be fed with resin and additives at the feed port and reinforcing additives (and other additives) can be fed downstream. In either case, a generally suitable melt temperature will be 230° C. to 300° C. The pre-compounded composition can be extruded and cut up into molding compounds such as conventional granules, pellets, and the like by standard techniques. The composition can then be molded in any equipment conventionally used for thermoplastic compositions capable of insert molding.

Advantageously, useful articles can be made from the modified polyalkylene terephthalate made according to the present process or thermoplastic compositions comprising the modified polyalkylene terephthalate. In a specific embodiment, an article is extruded, calendared, or molded, for example blow molded or injection molded from the modified polyalkylene terephthalate or composition containing the polymer. The article can be a film or a sheet. When the article is a film, the article can be formed by extrusion molding or calendaring the modified polyalkylene terephthalate or thermoplastic composition containing the polyester.

The thermoplastic compositions made from the present process can provide product lines that have superior hydrolytic stability. In particular, such thermoplastic compositions can provide improved hydro and heat resistance in abusive molding and outdoor application.

As stated above, various combinations of the foregoing embodiments can be used.

The invention is further described in the following illustrative examples in which all parts and percentages are by weight unless otherwise indicated.

EXAMPLES

Following is a list of materials, acronyms, and selected sources used in the examples.

BDO: 1,4-Butanediol (from BASF, with a purity specification of 99.5 wt. %)

TPT: Tetraisopropyl titanate, also referred to as titanium tetraisopropoxide (from DuPont, commercial TYZOR grade)

HP: Phosphoric acid (from Acros)

PBT: Poly(butylene terephthalate) as synthesized

Recycle PET: Recycled PET in the form of pellets was obtained from commercial sources, for example, commercially available from a vendor in India.

Equipment

The PBT resins were prepared on a lab scale in a 1-L 3-necked round bottom flask equipped with a condenser and a vacuum output.

Procedures and Testing of Polyester Resins $^1$H NMR spectroscopy allowed confirmation of the structures of the polymers synthesized. Polymer samples were first dissolved in a 70/30 mixture of deuterated TFA/chloroform and then subjected to $^1$H for compositional analysis.

Dynamic scanning calorimetry (DSC), employing a Perkin Elmer® DSC 7 equipped with Pyris® DSC 7 software, was used to determine melting characteristics of the polymers synthesized. In a typical procedure, a polymer sample (10-20 mg) was heated from −50° C. to 200° C. (20° C./min), held at 200° C. for 1 min, cooled back to −50° C. (20° C./min), then held at −50° C. for 1 min, and the above heating/cooling cycle was repeated. The second heating cycle is usually used to obtain the $T_m$ data.

The intrinsic viscosity (IV) of the polymer was measured using an automatic Viscotek Microlab® 500 series Relative Viscometer Y501. In a typical procedure, 0.5000 g of polymer sample was fully dissolved in a 60/40 mixture (by vol) of % phenol/1,1,2,2-tetrachloroethane solution (Harrell Industries). Two measurements were taken for each sample, and the result reported was the average of the two measurements.

Titanium and phosphorous concentrations were obtained from elemental analysis using inductive coupling plasma (ICP) microwave method to confirm the molar ratio of catalyst reactants, TPT and HP.

Example C-1

As a comparison example, modified PBT was prepared on a lab scale from recycled PET and 1,4-butanediol (BDO). A 86.4 g amount of recycled PET and 140 g of BDO were introduced into a three-neck round bottom flask. The reactor was placed in an oil bath temperature of 170° C. Then, 250 ppm of TPT was added to the reaction mixture, and the ester interchange temperature was increased to 220° C. at a rate of 2° C./min while stirring at 260 rpm under nitrogen. After waiting 40 minutes for depolymerization and the ester interchange to occur, the temperature of the reaction mixture was increased further to 250° C. Polymerization was initiated with the vacuum adjusted to below 1 Torr for 1 hour. The polymerization was stopped after achieving the desired intrinsic viscosity.

Example 2

Modified PBT was prepared was prepared on a lab scale from recycled PET and 1,4-butanediol (BDO) in the presence of a phosphorous-containing catalyst prepared in situ through the complexation between TPT and phosphoric acid in a 1:0.3 molar ratio. First, 50 g of BDO and 0.15 ml of phosphoric acid solution in water (0.1 g/ml) were introduced into a three neck round bottom flask. The reactor was placed in an oil bath at a temperature of 175° C. After 20 minutes, 250 ppm of TPT was added to the reactor and an in situ complexation between phosphoric acid and TPT was carried out for 40 minutes under $N_2$ atmosphere. Then, 87.4 g of PET and 80 g of additional BDO were introduced into the catalyst solution, and the ester interchange temperature was increased to 220° C. at a rate of 2° C./min while stirring at 260 rpm under nitrogen. After the depolymerization ceased, the temperature of the reaction mixture was further increased to 250° C. to melt the residual PET flakes completely. Polymerization was initiated with vacuum adjusted to below 1 Torr for 40 minutes. The polymerization was stopped after achieving the desired intrinsic viscosity.

Example 3

Modified PBT was prepared was prepared on a lab scale from recycled PET and 1,4-butanediol (BDO) using a catalyst was prepared in situ by the reaction between TPT and phosphoric acid in a 1:0.6 molar ratio. First, 50 g of BDO and the phosphoric acid solution (0.1 g/ml in water), to provide the necessary ratio, were introduced into a three neck round bottom flask. The reactor was placed in an oil bath at a temperature of 175° C. After 20 minutes, 250 ppm of TPT was added to the reactor, and an in situ complexation between phosphoric acid and TPT was carried out for 40 minutes under a $N_2$ atmosphere. Then, 87.4 g of PET and 80 g of additional BDO were introduced into the catalyst solution, and the ester interchange temperature was increased to 220° C. at a rate of 2° C./min while stirring at 260 rpm under nitrogen. After the depolymerization is completed and ceases, the temperature of the reaction mixture was further increased to 250° C. to melt the residual PET flakes completely. Polymerization was initiated with the vacuum adjusted to below 1 Torr and carried out for 40 minutes. The polymerization was stopped after achieving the desired intrinsic viscosity.

Example 4

Modified PBT was prepared was prepared one lab scale from recycled PET, and 1,4-butanediol (BDO) using catalyst that was prepared in situ by the reaction between TPT and phosphoric acid in 1:1 molar ratio. First, 50 g of BDO, phosphoric acid solution (0.1 g/ml in water), to obtain the indicated molar ratio, were introduced into a three-neck round bottom flask, which was placed in an oil bath at a temperature of 175° C. After 20 minutes, 250 ppm of TPT was added to the reactor and in situ complexation between phosphoric acid and TPT was carried out for 40 minutes under a nitrogen atmosphere. Then, 87.4 g of PET, and 80 g of additional BDO were introduced into the catalyst solution, and the ester interchange temperature was increased to 220° C. at a rate of 2° C./min while stirring at 260 rpm under nitrogen. After the completed depolymerization ceases, the temperature of the reaction mixture was further increased to 250° C. to melt the residual PET flakes completely. Polymerization was initiated with the vacuum adjusted to below 1 Torr and carried out for 40 minutes. The polymerization was stopped after achieving the desired intrinsic viscosity.

Example 5

Modified PBT was prepared was prepared on a lab scale from recycled PET and 1,4-butanediol (BDO) using catalyst prepared in situ by the reaction between TPT and phosphoric acid in a 1:1.2 molar ratio. First, 50 g of BDO and phosphoric acid solution (0.1 g/ml in water), to obtain the indicated molar ration, were introduced into a three-neck round bottom flask. The reactor was placed in an oil bath at a temperature of 175° C. After 20 minutes, 250 ppm of TPT was added to the reactor and an in situ complexation between phosphoric acid and TPT was carried out for 40 minutes under nitrogen atmosphere. Then, 87.4 g of PET and 80 g of additional BDO were introduced into the catalyst solution and the ester interchange temperature was increased to 220° C. at a rate of 2° C./min while stirring at 260 rpm under nitrogen. After the completed depolymerization ceased, the temperature of the reaction mixture was further increased to 250° C. to melt the residual PET flakes completely. Polymerization was initiated with the vacuum adjusted to below 1 Torr for 40 minutes. The polymerization was stopped after achieving desired intrinsic viscosity.

Example 6

Modified PBT was prepared was prepared on a lab scale from recycled PET and 1,4-butanediol (BDO) in which the catalyst was prepared in situ by the reaction between TPT and phosphoric acid in a 1:1.5 molar ratio. First, 50 g of BDO and phosphoric acid solution (0.1 g/ml in water) were introduced into a three-neck round bottom flask. The reactor was placed in an oil bath at a temperature of 175° C. After 20 minutes, 250 ppm of TPT was added to the reactor and in situ complexation between phosphoric acid and TPT was carried out for 40 minutes under a nitrogen atmosphere. Then, 87.4 g of PET and 80 g of additional BDO were introduced into the catalyst solution, and the ester interchange temperature was increased to 220° C. with a rate of 2° C./min while stirring at 260 rpm under nitrogen. After the completed depolymerization ceased, the temperature of the reaction mixture was further increased to 250° C. to melt the residual PET flakes completely. Polymerization was initiated with the vacuum adjusted to below 1 Torr for 40 minutes. The polymerization was stopped after achieving desired intrinsic viscosity.

Example 7

Modified PBT was prepared was prepared on a lab scale from recycled PET and 1,4-butanediol (BDO) in which the catalyst was prepared in situ by the reaction between TPT and phosphoric acid in a 1:2 molar ratio. First, 50 g of BDO and phosphoric acid solution in water (0.1 g/ml), to obtain the indicated molar ratio, were introduced into a three neck round bottom flask that was placed in an oil bath at a temperature of 175° C. After 20 minutes, 250 ppm of TPT was added to the reactor, and an in situ complexation between phosphoric acid and TPT was carried for 40 minutes under a nitrogen atmosphere. Then, 87.4 g of PET and 80 g of additional BDO were introduced into the catalyst solution. The ester interchange temperature was increased to 220° C. at a rate of 2° C./min while stirring at 260 rpm under the nitrogen. After the completed depolymerization ceased, the temperature of the reaction mixture was further increased to 250° C. to melt the residual PET flakes completely. Polymerization was initiated with the vacuum adjusted to below 1 Torr and carried out for 40 minutes. The polymerization was stopped after achieving the desired intrinsic viscosity.

Example 8

Modified PBT was prepared was prepared on a lab scale from recycled PET and 1,4-butanediol (BDO) using catalyst prepared in situ by the reaction between TPT and phosphoric acid in a 1:3 molar ratio. First, 50 g of BDO and the requisite amount of phosphoric acid solution in water (0.1 g/ml) to obtain the indicated molar ratio were introduced into a three-neck round bottom flask. The reactor was placed in an oil bath at a temperature of 175° C. After 20 minutes, 250 ppm of TPT was added to the reactor. An in situ complexation between phosphoric acid and TPT was carried out for 40 minutes under nitrogen atmosphere. Then, 87.4 g of PET and 80 g of additional BDO were introduced into the catalyst solution. The ester interchange temperature was increased to 220° C. at a rate of 2° C./min while stirring at 260 rpm under nitrogen. After the completed depolymerization ceased, the temperature of the reaction mixture was further increased to 250° C. to melt the residual PET flakes completely. Polymerization was initiated and carried out with the vacuum adjusted to below 1 Torr for 40 minutes. The polymerization was stopped after achieving the desired intrinsic viscosity.

The modified PBT resins prepared in Examples 1-8 were tested and results shown in Table 1 below.

TABLE 1

| Ex. No. | Phosphoric Acid/TPT | TPT Amount (ppm) | IV (dL/min) | $T_m$ (°C.) | PDI | Mn | Mw |
|---|---|---|---|---|---|---|---|
| C-1 | 0 | 250 | 0.976 | 216 | 2.8 | 32000 | 89000 |
| 2 | 0.3 | 250 | 0.905 | 220 | 2.8 | 31000 | 86000 |
| 3 | 0.6 | 250 | 0.725 | 219 | 2.6 | 24000 | 63000 |
| 4 | 1 | 250 | 0.791 | 216 | 2.8 | 25000 | 69000 |
| 5 | 1.2 | 250 | 0.848 | 218 | 3.1 | 27000 | 63000 |
| 6 | 1.5 | 250 | 0.661 | 209 | 2.6 | 22000 | 57000 |
| 7 | 2 | 250 | 0.618 | 181 | 2.5 | 22000 | 55000 |
| 8 | 3 | 250 | 0.202 | 119 | 2.2 | 4900 | 11000 |

Table 1 summarizes the intrinsic viscosity, melting temperature, and molecular weight of the resin samples made as described in Examples 1-8, prepared by a polycondensation reaction between PET and BDO. Example C-1 represents the control. Examples 2 to 8 were synthesized with an situ catalyst according to the present process. The phosphoric acid to TPT molar ratios given in Table 1 are the calculated molar ratio based on the amounts used for the catalyst preparation.

Figure 1:
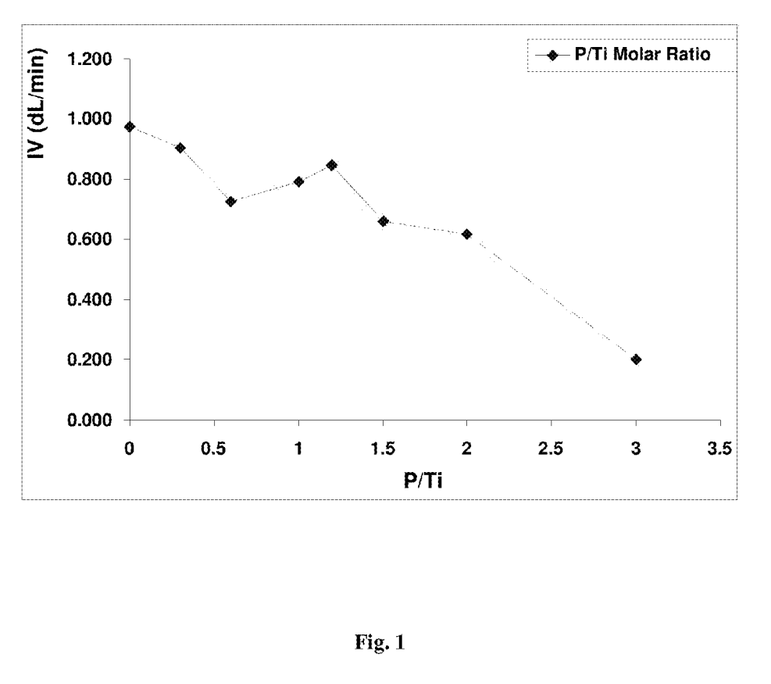
FIG. 1 shows intrinsic viscosity versus molar ratio of phosphoric acid to tetraisopropyl titanate used in the preparation of the in situ catalyst as described in Examples 1-8.
Figure 2:
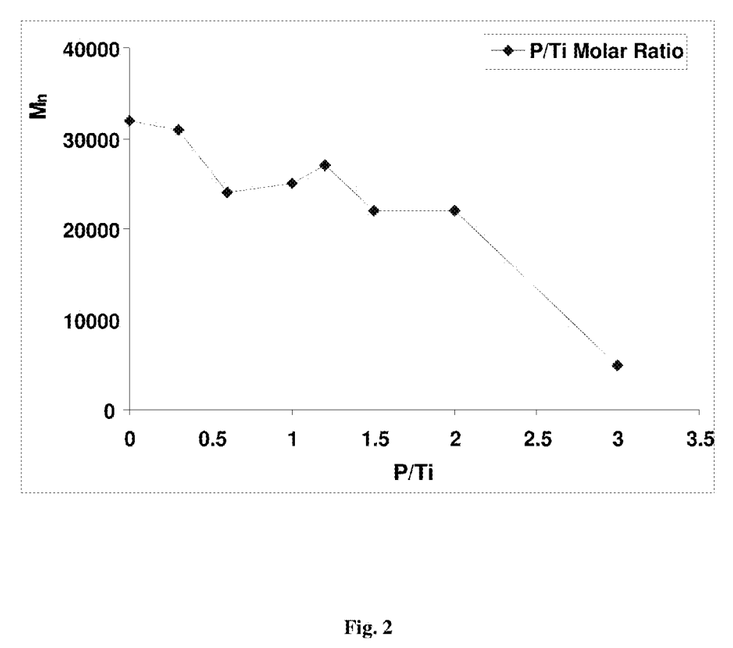
FIG. 2 shows number average number molecular weight versus molar ratio of phosphoric acid to tetraisopropyl titanate used in the preparation of the in situ catalyst as described in Examples 1-8.

A strong correlation was found between the IV and number average molecular weight results for the resins. The present process enables high molecular weight polyester and IV up to 1.2 molar ratio between phosphoric acid and TPT (Examples 2-5). Above this ratio, the IV and molecular weight of the PBT resin started decreasing gradually (FIGS. 1 and 2). At the molar ratio of 3, the polymerization resulted in oligomers.

As analyzed, the backbone compositions of the PBT prepared in the comparative Example C-1 and Examples 2-8 prepared in the presence of TPT and phosphoric acid are shown in Table 2.

TABLE 2

| Ex. No. | Phosphoric Acid/TPT Mole Ratio | Catalyst Amount (ppm) | Isophthalic (mol %) | Terephthalic (mol %) | EG (mol %) | BDO (mol %) |
|---|---|---|---|---|---|---|
| C-1 | 0 | 250 | 1.0 | 49.7 | 1.4 | 48.0 |
| 2 | 0.3 | 250 | 1.0 | 49.6 | 1.1 | 48.3 |
| 3 | 0.6 | 250 | 1.0 | 49.5 | 1.5 | 48.0 |
| 4 | 1 | 250 | 1.0 | 49.6 | 1.9 | 47.5 |
| 5 | 1.2 | 250 | 1.0 | 49.8 | 1.4 | 47.8 |
| 6 | 1.5 | 250 | 1.0 | 49.9 | 4.9 | 44.1 |
| 7 | 2 | 250 | 1.0 | 50.3 | 17.6 | 31.1 |
| 8 | 3 | 250 | 0.9 | 50.2 | 22.1 | 26.9 |

Table 2 above summarizes the backbone chemical composition of the resin, which was obtained through proton NMR. Since recycled PET was used as a monomer feedstock, the introduction of comonomer impurities such as isophthalic and ethylene glycol (EG) moieties was inevitable. (The ethylene glycol (EG) content within the PBT backbone can be varied depending on the vacuum condition, i.e., process parameters.) An amount of 1 mol % of isophthalic moieties within the backbone was found acceptable in not unduly changing the crystallinity and melting temperature of the resin product.

Figure 3:
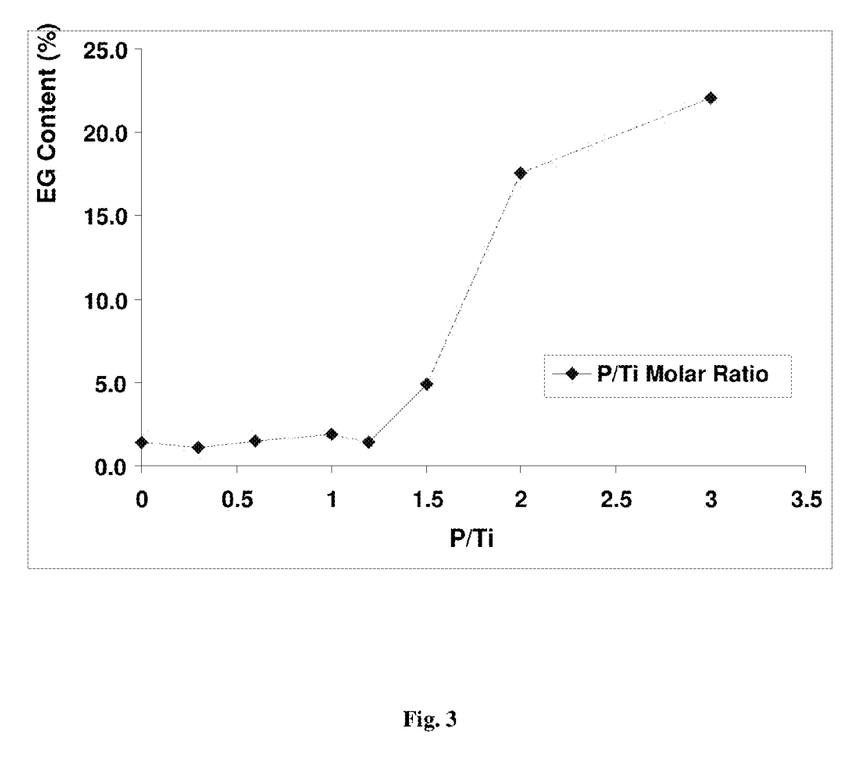
FIG. 3 shows ethylene glycol (EG) content versus molar ratio of phosphoric acid to tetraisopropyl titanate used in the preparation of the in situ catalyst in accordance with Examples 1-8.

FIG. 3 represents the relationship between the catalyst-component molar ratio and EG content in the PBT backbone. The EG content was found to stay under 2 mol % up to a P/Ti molar ratio of 1.2. Above this molar ratio, the EG content continued to gradually increase. Using the catalyst that was prepared in a molar ratio greater than 1.2 was found to result in the catalyst losing its transesterification capability for butylene terephthalate and favoring more PET polymerization, which led to a large increase of the polymerization time. The large increase in EG content in the backbone above a molar ratio of 1.2 affects the crystallinity of the resulting resin by lowering the melting temperature.

Figure 4:
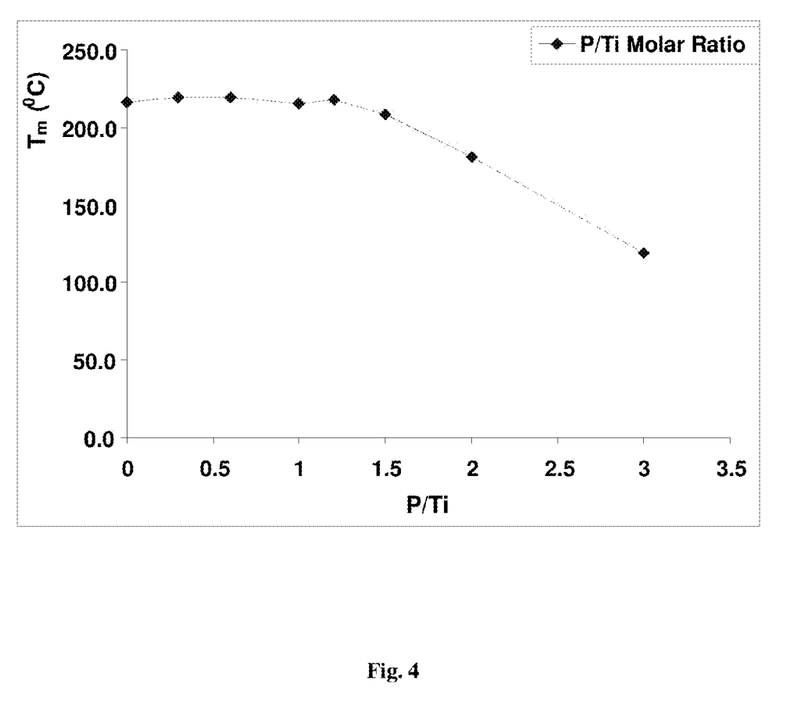
FIG. 4 shows the relationship between the melting point ($T_m$) of polybutylene terephthalate prepared according to the present invention versus molar ratio of phosphoric acid and tetraisopropyl titanate used in the preparation of the in situ catalyst, as described in Examples 1-8.

The melting temperatures of Examples 2 to 5 were similar to the melting temperature of the control (Example C-1). After the molar ratio of 1.2, however, the melting temperature gradually dropped. FIG. 4 shows the relation between the melting temperature of the resin and the molar ratio between phosphoric acid and TPT. The melting temperature gradually decreased above the molar ratio of 1.2 and, below this molar ratio stayed very close to the melting temperature of the control Example C-1.

Based on the examples, it can be concluded that the synthesis of modified PBT from the melt polycondensation reaction between PET and BDO can be accomplished in the presence of new in situ catalyst prepared by the reaction of TYZOR® TPT catalyst and phosphoric acid prior to the depolymerization and ester interchange. Furthermore, the ratio between phosphoric acid and TPT can be controlled to obtain a PBT providing the same standard performance as virgin PBT shows. In these particular examples, the molar ratio of 1.2, with respect to the novel catalyst, was the maximum ratio for the process to obtain a molecular weight, IV, melting temperature and EG content within a given limit, wherein the molecular weight, IV, and melting temperature decreased along with a catalyst-component molar ratio greater than 1.2. The catalyst-component molar ratio was found to affect the introduction of EG moieties in the PBT backbone, wherein above the molar ratio of 1.2, the EG content increased above 2 mol %, resulting in a crystallinity and melting temperature drop, whereas a total impurity level (isophthalic acid and EG) below 3 mole % provides a modified PBT resin with a standard performance similar to virgin PBT resin.

All cited patents, patent applications, and other references are incorporated herein by reference in their entirety.

Although the present invention has been described in detail with reference to certain preferred versions thereof, other variations are possible. Therefore, the spirit and scope of the appended claims should not be limited to the description of the versions contained therein.

What is claimed is:

1. A process of preparing a modified polyalkylene terephthalate from recycled polyethylene terephthalate, the process comprising:
    forming a catalyst consisting of the reaction product of tetra($C_1$-$C_8$ alkyl) titanate and phosphoric acid, wherein the molar ratio of the phosphoric acid to the tetra($C_1$-$C_8$ alkyl) titanate is from 0.05:1 to less than or equal to 2:1;
    depolymerizing the polyethylene terephthalate by combining the polyethylene terephthalate, in the presence of the catalyst, with a dihydric alcohol selected from the group $C_2$-$C_{20}$ alkylene diols to obtain a molten mixture; and
    polymerizing the molten mixture in the continued presence of the catalyst and $C_3$-$C_{20}$ alkylene diol, which alkylene diol is added during or after depolymerization such that the same or different alkylene diol can be present during depolymerization and polymerization, to yield modified polyalkylene terephthalate.

2. The process of claim 1, wherein the catalyst is made prior to depolymerization.

3. The process of claim 1, wherein the catalyst is synthesized in situ, prior to depolymerization of the polyethylene terephthalate, by combining the tetra($C_1$-$C_8$ alkyl) titanate and the phosphoric acid in the dihydric alcohol used to depolymerize the polyethylene terephthalate.

4. The process of claim 1, wherein the molar ratio of the phosphoric acid to the tetra($C_1$-$C_8$ alkyl) titanate is from 0.1:1 to less than or equal to 1.2:1.

5. The process of claim 1, wherein the $C_2$-$C_{20}$ alkylene diol and/or the $C_3$-$C_{20}$ alkylene diol used in the process is synthesized from biomass.

6. The process of claim 1, wherein the $C_3$-$C_{20}$ alkylene diol is selected from the group 1,4-butanediol, 1,3-propanediol, and combinations thereof.

7. The process of claim 1 comprising preparing the catalyst in situ, in a catalyst solution, by combining the tetra($C_1$-$C_8$ alkyl) titanate, phosphoric acid, and $C_2$-$C_{20}$ alkylene diol, prior to addition of the polyethylene terephthalate, wherein the catalyst solution is subject to heat at an elevated first temperature.

8. The process of claim 7 comprising forming a catalyzed reactant mixture by combining the polyethylene terephthalate with the catalyst solution, optionally with the addition of a further amount of said dihydric alcohol, and subjecting the catalyzed reactant mixture to heat to obtain substantially complete depolymerization and ester interchange at an elevated second temperature, in the range of 170-220° C.

9. The process of claim 8, wherein after substantial completion of the depolymerization and ester interchange to form a depolymerized mixture, subjecting the depolymerized mixture to heat to melt residual particles of polyethylene terephthalate at an elevated third temperature higher than the second temperature to obtain a molten depolymerized mixture.

10. The process of claim 9 comprising initiating polymerization of the molten depolymerized mixture by subjecting the molten depolymerized mixture to heat under vacuum, optionally with distillation, at a pressure of less than 2 Torr and at a temperature of 220° C. to 270° C. to obtain a preselected final intrinsic viscosity for the modified polyalkylene terephthalate.

11. The process of claim 9 comprising initiating polymerization of the molten depolymerized mixture under vacuum by subjecting the depolymerized mixture to vacuum under heat, optionally with distillation, at a pressure of less than 2 Torr and a temperature of 220° C. to 270° C. until an intrinsic viscosity of 0.4 to 0.6 is obtained and then initiating solid state polymerization at a temperature of 200° C. to 220° C. to obtain a preselected final intrinsic viscosity for the modified polyalkylene terephthalate.

12. The process of claim 1, wherein the tetra($C_1$-$C_8$ alkyl) 1 titanate that is reacted with the complexing agent phosphoric acid is provided in a total amount of 25 to 1000 ppm, based on the total weight of the composition.

13. The process of claim 1, wherein the titanium in the catalyst is present in the process, during the depolymerization and polymerization reactions, in an amount of 10 to 1000 ppm, based on the total weight of the composition.

14. The process of claim 1, wherein polymerization is stopped after obtaining a modified polyalkylene terephthalate having a number average molecular weight of at least 15,000 g/mol and a polydispersity index (PDI) of from 2 to less than 6.

15. The process of claim 1, wherein the process yields a modified polyalkylene terephthalate having a weight average molecular weight of 10,000 to 70,000, —COOH end groups in the amount of 5 to 40 meq/Kg resin, and —OH end groups in the amount of 10 to 70 meq/Kg resin.

16. The process of claim 1, wherein the polyethylene terephthalate is recycled polyethylene terephthalate that has been subject to previous consumer or industrial use and is converted to particulate solid form.

17. The process of claim 1, wherein the backbone of the modified polyalkylene terephthalate comprises at least one monomer residue exclusively derived from the polyethylene terephthalate.

18. The process of claim 1, wherein the backbone of the modified polyalkylene terephthalate comprises less than 5 mole percent of repeat units derived from ethylene glycol and has a melting point of above 200° C.

19. A process of preparing a modified polyalkylene terephthalate from recycled polyethylene terephthalate, which process comprises:
    forming a catalyst consisting of the reaction product of tetra($C_1$-$C_8$ alkyl) titanate and phosphoric acid, wherein the molar ratio of the phosphoric acid to the tetra($C_1$-$C_8$ alkyl) titanate is from 0.05:1 to less than or equal to 2:1,
    depolymerizing polyethylene terephthalate by combining and subjecting to heat the polyethylene terephthalate, in the presence of the catalyst, with a first dihydric alcohol that is selected from the group $C_2$-$C_4$ alkylene diols, and combinations thereof, to thereby obtain a molten depolymerized mixture;
    adding a second dihydric alcohol to the molten depolymerized mixture selected from the group $C_3$-$C_4$ alkylene diols, which second dihydric alcohol is different than the first dihydric alcohol, to thereby obtain a second molten depolymerized mixture;
    polymerizing the second molten mixture in the continued presence of the catalyst to yield a modified polyalkylene terephthalate.

20. The process of claim 19, wherein the catalyst is synthesized in situ, prior to depolymerization of the polyethylene terephthalate by combining the catalyst with the first dihydric alcohol to obtain a catalyst solution.

21. A process of preparing a modified polybutylene terephthalate from recycled polyethylene terephthalate by melt polycondensation, the process comprising:
    forming a catalyst solution in which the catalyst consists of the reaction product of tetra($C_1$-$C_8$ alkyl) titanate and phosphoric acid, which catalyst is synthesized in situ, prior to depolymerization of polyethylene terephthalate, by combining, at an elevated first temperature, the tetra ($C_1$-$C_8$ alkyl) titanate and the phosphoric acid in butanediol and/or ethylene glycol, wherein the catalyst is formed employing a phosphoric acid to tetra($C_1$-$C_8$ alkyl) titanate molar ratio of 0.1:1 to 1.2:1;
    forming a catalyzed reactant mixture by subsequently combining the catalyst solution with recycled polyethylene terephthalate, optionally with additional butanediol and/or ethylene glycol, and subjecting the catalyzed reactant mixture to heat to obtain substantially complete depolymerization and ester interchange at an elevated second temperature to form a depolymerized mixture;
    subjecting the depolymerized mixture to heat to melt residual particles of polyethylene terephthalate at an elevated third temperature higher than the second temperature to obtain a molten depolymerized mixture;
    polymerizing the molten depolymerized mixture under vacuum, in the presence of butanediol added following depolymerization if not before, by subjecting the molten depolymerized mixture to vacuum under heat, optionally with distillation, at a pressure of less than 2 Torr and a temperature of 220° C. to 270° C.; and
    stopping polymerization when obtaining a modified polybutylene terephthalate having a number average molecular weight of at least 15,000 g/mol.

22. The process of claim 21, wherein the tetra($C_1$-$C_8$ alkyl) titanate is tetraisopropyl titanate.

\* \* \* \* \*